June 30, 1964  R. G. PETERSON  3,139,288
BUILDING MOVER WITH PIVOTAL AXLE
Filed Nov. 28, 1962  2 Sheets—Sheet 1
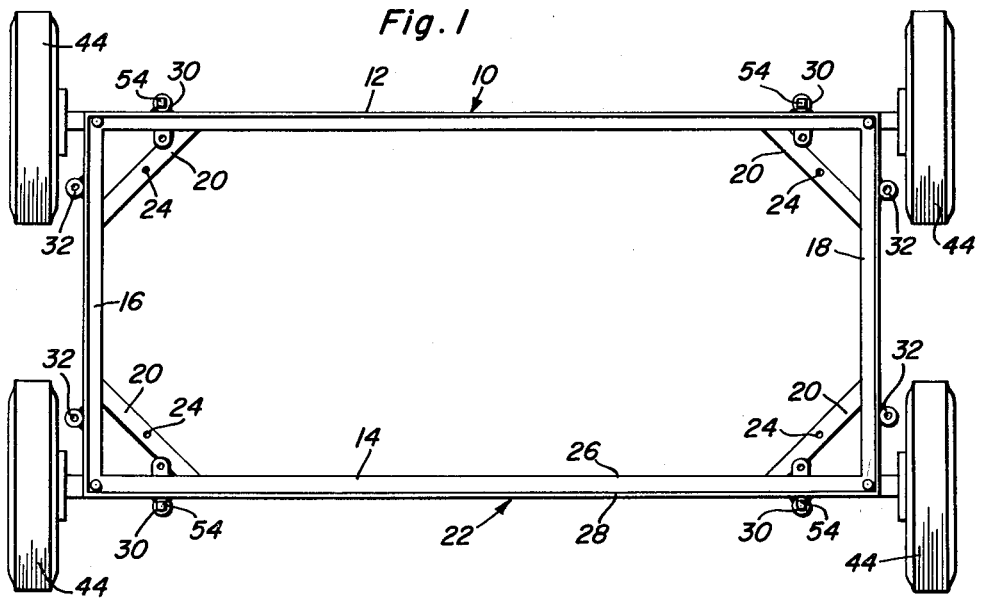
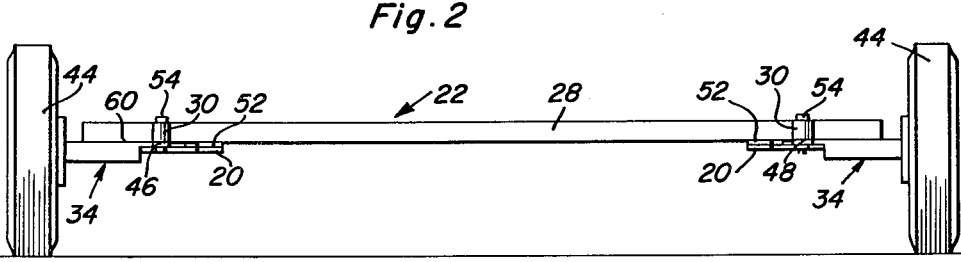
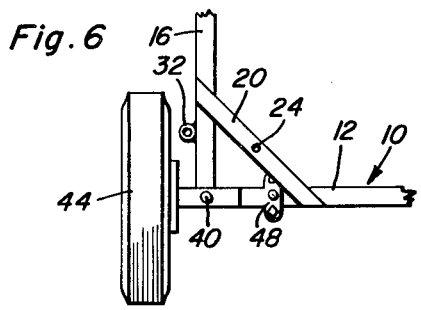
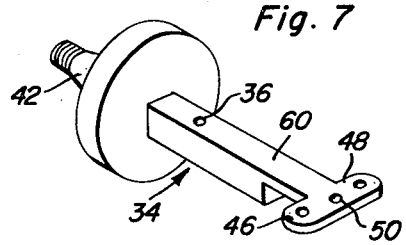
Reuben G. Peterson
INVENTOR.
BY *Clarence A. O'Brien*
and *Harvey B. Jacobson*
Attorneys June 30, 1964 R. G. PETERSON 3,139,288
BUILDING MOVER WITH PIVOTAL AXLE
Filed Nov. 28, 1962 2 Sheets-Sheet 2
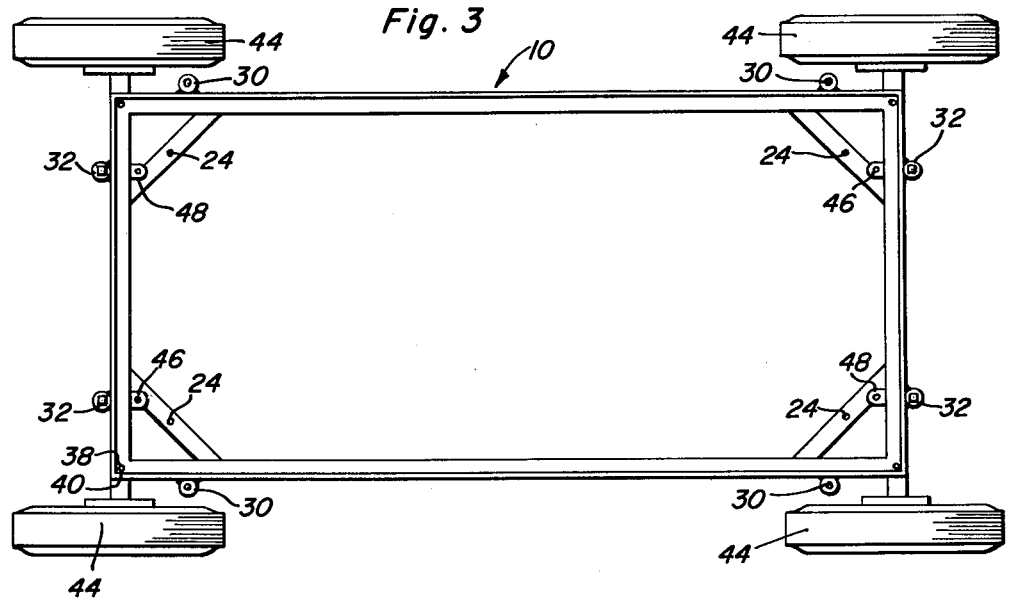
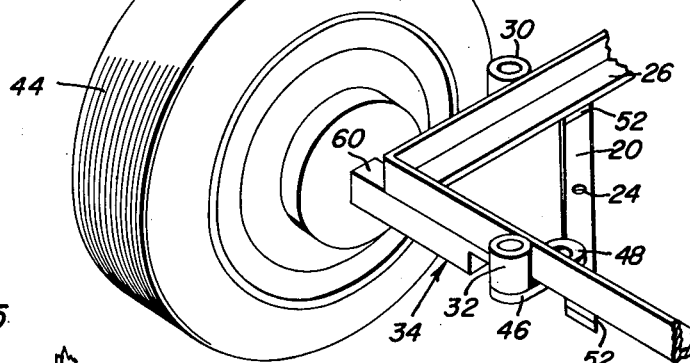
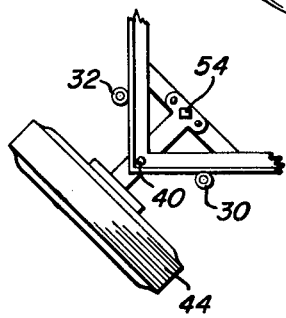
Reuben G. Peterson
INVENTOR.

United States Patent Office 3,139,288
Patented June 30, 1964

3,139,288
BUILDING MOVER WITH PIVOTAL AXLE
Reuben G. Peterson, Wessington Springs, S. Dak.
Filed Nov. 28, 1962, Ser. No. 240,530
2 Claims. (Cl. 280—34)

This invention relates to a novel and useful building mover and more specifically to a trailer type of vehicle having supporting wheel assemblies thereon which may be readily rotated about upstanding axes either 45° or 90° in order that the trailer frame may be moved diagonally of or at right angles to the longitudinal axis of the frame.

The building mover of the instant invention has been primarily designed for moving buildings, house trailers and the like and is very useful in enabling trailer homes and the like to be pulled down a street or pathway and then slipped sideways into a narrow parking space. In addition, it is possible that the trailer construction of the instant invention could be incorporated into automobiles and the like so that automobiles could be moved laterally into and out of parking spaces.

The main object of this invention is to provide a building mover or trailer having a wheeled main frame constructed in a manner enabling the main frame to be moved transversely of its longitudinal axis as well as longitudinally thereof.

A further object of this invention, in accordance with the preceding object, is to provide a wheeled supporting frame including supporting wheel assemblies that may be adjustably positioned about upstanding axes throughout an arc of 90° thereby enabling the vehicle or frame to move in directions disposed at 90° relative to each other as well as any direction between those two directions disposed at 90° relative to each other.

Another object of this invention is to provide a building mover in accordance with the preceding objects which can be readily utilized to move various types of loads.

A final object to be specifically enumerated herein is to provide a building mover in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of the building mover of the instant invention;

FIGURE 2 is a side elevational view of the building mover illustrated in FIGURE 1;

FIGURE 3 is a top plan view of the building mover similar to that of FIGURE 1 of the drawings but showing the supporting wheel assemblies thereof rotated 90°;

FIGURE 4 is a fragmentary enlarged perspective view of one corner of the main frame of the building mover;

FIGURE 5 is a fragmentary top plan view of one corner of the frame of the building mover showing a further pivoted position in which the wheel assemblies may be secured;

FIGURE 6 is a bottom plan view of one of the corners of the main frame of the building mover; and FIGURE 7 is a perspective view of one of the axle members of the building mover.

Referring now more specifically to the drawings, the numeral 10 generally designates the building mover of the instant invention which may be seen in FIGURES 1 and 3 of the drawings as comprising a pair of longitudinal opposite side members 12 and 14 interconnected at corresponding ends by means of transverse opposite side members 16 and 18. In addition, the main frame defined by the side members 12, 14, 16 and 18 includes four diagonal brace members 20 which are secured between adjacent end portions of the side members of the main frame of the building mover 10 which frame is referred to by the reference numeral 22. The diagonal brace members 20 are apertured intermediate their opposite ends as at 24 and it will be noted that each of the side members 12, 14, 16 and 18 is an angle member including a horizontal leg 26 and an upstanding leg 28.

With attention now directed to FIGURE 4 of the drawings it may be seen that each wheel supporting location or corner of the main frame 22 has a pair of sleeves 30 and 32 secured to the adjacent ends of the corresponding longitudinal and transverse members. The sleeves 30 and 32 are secured to the corresponding side members a spaced distance from the intersection thereof and it may be noted that an axle member generally referred to by the reference numeral 34 is provided with a transverse bore 36 intermediate its opposite ends. Each corner of the frame 22 has an aperture 38 formed therethrough with which the corresponding bore 36 is aligned. A fastener 40 is secured through the registered bores and apertures 36 and 38 and thereby pivotally secures the axle members 34 to the four corners of the main frame 22.

Each of the axle members 34 includes a spindle portion 42 on which a ground-engaging support wheel 44 is rotatably journaled in any convenient manner and it will be noted that the end of each axle member 34 remote from the spindle portion 42 is provided with a pair of laterally directed apertured tabs or ears 46 and 48 which are registrable with the corresponding sleeve members 30 and 32 of the adjacent corner of the main frame 22. In addition, each of the axle members 34 is also apertured as at 50 and the aperture 50 is registrable with the corresponding one of the aptreures 24.

From FIGURE 4 of the drawings it may be seen that the diagonal brace members 20 have their opposite ends secured to the corresponding legs 26 by means of spacer blocks 52 which are slightly greater in width than the apertured tabs or ears 46 and 48.

In operation, and with attention now directed to FIGURE 1 of the drawings it will be noted that fasteners 54 are utilized to secure the outermost tabs 46 and 48 to the longitudinal side members 12 and 14 by means of the sleeves or cylindrical members 30 secured thereto. If it is desired to secure the axle members 34 in rotated positions such as those illustrated in FIGURE 3, the fasteners 54 may be removed and utilized to secure the opposite one of the corresponding tabs 46 and 48 to the transverse side members 16 and 18 by means of the sleeves or cylindrical members 32. In addition, it may be seen from FIGURE 5 of the drawings that the axle members 34 may be secured in a still further adjusted rotated position by the securement of the fasteners 54 through the aligned apertures 50 and 24.

It will be noted from a comparison of FIGURES 1 and 3 of the drawings that the axle members 34 underlie and generally parallel the side members to which they are anchored by means of the fasteners 54. In addition, it may be seen that the upper surface 60 of each of the axle members 34 is planar and that it is therefore adapted to be disposed in surface-to-surface contacting relation with the undersurface of the corresponding leg 26. In this manner, not only is each axle member 34 secured in adjusted rotated position, but it receives support from the side member to which it is anchored. Still further, from FIGURES 1, 3, 4, 5 and 6 of the drawings it may be seen that the apertured ears or tabs 46 and 48 extend over the corresponding diagonal brace member 20 further ensuring that the end of each axle member 34 remote from the spindle 42 thereof will not swing downwardly away from the medial plane of the main frame 22 upon the placement of a heavy load on the main frame 22.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A cart for moving articles, said cart including frame means defining a plurality of wheel supporting locations provided with pivotable wheel assemblies, each of said wheel assemblies including an axle member having a support wheel journaled thereon, said wheel assemblies and said wheel supporting locations of said frame means including coacting means releasably supporting said axle members in adjusted rotated positions relative to said frame means about axes extending at substantially right angles to the axes of rotation of said supporting wheels, said frame means comprising a substantially rectangular frame, said coacting means including means pivotally securing said axle members each to one of the corners of said frame for rotation about an axis extending at substantially right angles to the medial plane of said frame and means on each of said axle members spaced from and disposed on an opposite side of its axis of rotation remote from the corresponding support wheel releasably and selectively engageable with one of the sides of a pair of adjacent sides of said frame defining the corresponding corner of said frame, said frame including two pair of opposite sides disposed at substantially right angles to each other and interconnected at adjacent end portions, said releasably and selectively engageable means comprising an anchor secured to each side of said frame adjacent each corner thereof, retaining means carried by said axle member remote from its supporting wheel selectively engageable with the anchors adjacent the corresponding corner of said frame, each of said anchors comprising a sleeve member generally paralleling the axis of rotation of the corresponding axle member, said retaining means comprising an apertured tab portion carried by the corresponding axle member and registrable with said sleeve member, registered ones of said tab and sleeve members having fasteners secured therethrough, each of said axle members including a pair of said apertured tabs disposed on opposite sides of the longitudinal axis of that axle member, corresponding pairs of said sleeve members being secured to the outer surfaces of the corresponding sides of said frame and each registrable with the outermost tab of the axle member anchored thereto, each corner of said frame including a diagonal brace member with the upper surface of the mid-portion of each diagonal brace member disposed between the corresponding frame sides being disposed in a plane substantially generally paralleling and slightly below the plane in which the lower surfaces of the corresponding tabs swing, the innermost tab of each axle member projecting inwardly of the corresponding frame side and overlapping the adjacent end of the corresponding diagonal brace member.

2. The combination of claim 1 wherein said axle members each underlie, generally parallel and have their ends remote from the corresponding support wheel disposed in surface-to-surface contacting relation with the undersurface of the corresponding frame side.

References Cited in the file of this patent

UNITED STATES PATENTS

| | | |
|---|---|---|
| 2,311,891 | Tyson | Feb. 23, 1943 |
| 2,973,818 | Marvin | Mar. 7, 1961 |
| 2,981,548 | Taylor | Apr. 25, 1961 |

FOREIGN PATENTS

| | | |
|---|---|---|
| 1,045,699 | Germany | Dec. 4, 1958 |
| 811,860 | Germany | Aug. 23, 1961 |